United States Patent [19]

Royal

[11] Patent Number: 5,151,175
[45] Date of Patent: Sep. 29, 1992

[54] SYSTEM TO AUTOMATICALLY DRAIN FILTER BACKWASH WATER

[76] Inventor: Claude S. Royal, P.O. Box 2143, Lynchburg, Va. 24501

[21] Appl. No.: 729,205

[22] Filed: Jul. 12, 1991

[51] Int. Cl.⁵ .................... G05D 7/00; B01D 35/157; E21B 34/16
[52] U.S. Cl. .................... 210/108; 137/107; 137/568; 166/53; 166/75.1; 210/257.1; 210/416.3; 210/418
[58] Field of Search .............. 137/107, 565, 568; 210/10, 8, 116, 136, 257.1, 258, 170, 411, 97, 416.1, 416.3, 418; 166/53, 75.1

[56] References Cited

U.S. PATENT DOCUMENTS

| | | | |
|---|---|---|---|
| 204,663 | 6/1878 | Gainey | 210/257.1 |
| 2,239,612 | 4/1941 | Lawlor | 210/257.1 |
| 2,268,076 | 12/1941 | Lawlor | 210/257.1 |
| 2,392,782 | 1/1946 | Snyder | 137/107 |
| 3,011,553 | 12/1961 | Ortman | 166/75.1 |
| 3,581,895 | 6/1971 | Howard et al. | 210/108 |
| 3,820,658 | 6/1974 | Cruze, Jr. | 210/108 |
| 3,834,535 | 9/1974 | Portyrata | 210/108 |
| 4,477,343 | 10/1984 | Tucker | 210/108 |
| 4,549,961 | 10/1985 | Bellemann et al. | 210/108 |
| 4,631,126 | 12/1986 | Keith et al. | 210/108 |
| 4,806,217 | 2/1989 | Rosenberg | 210/108 |

Primary Examiner—Robert A. Dawson
Assistant Examiner—Joseph Drodge
Attorney, Agent, or Firm—Kimmel, Crowell & Weaver

[57] ABSTRACT

A system for providing filtered well water to a building includes a filter, an accumulator downstream of the filter, and an automatic backwash valve between the filter and the well. When the well pump is deactivated, the accumulator discharges its contents back through the filter, towards the valve, which contains a shuttle that automatically diverts the backwash water to a drain line. The valve also prevents contaminants from being siphoned into the system through the drain line.

3 Claims, 3 Drawing Sheets

SYSTEM TO AUTOMATICALLY DRAIN FILTER BACKWASH WATER

BACKGROUND OF THE INVENTION

This invention relates to home water supply plumbing, particularly to a system for automatically backwashing a filter each time a well pump is deactivated.

In a well water system, removal of sediment is usually effected by a filter, placed in the supply line extending between the well and a storage tank in the home. Over time, the filter becomes loaded with sediment, increasing the pressure loss through the filter, and requiring periodic cleaning or replacement of the filter element.

One way of cleaning a filter element is to backwash it, by forcing fluid backwards through the filter. There are some filter systems, in other environments, in which back-washing is done automatically, on an occasional or periodic basis. For example, U.S. Pat. No. 3,581,895 shows a filter system with an electromagnetically actuated reversing spool-type valve to control backwashing.

Not all backwashing systems require electrical actuators. Some are purely mechanical, and it has previously been realized that compressed gas can be used to cause a backwashing flow through filter media. For example, U.S. Pat. No. 3,834,535 discloses a swimming pool filter system comprising a filter containing a compressible member which expands when pump pressure is released to backwash a filter. U.S. Pat. No. 3,820,658 describes a sewage plant system having an air chamber which causes backwashing of the filter material when pumping pressure is reduced. The backwash liquid is returned to the source.

The prior patents do not provide simple devices which could be readily installed into a well water supply system, nor do they provide valving which would not only backwash a filter, but also direct backwash water to a drain, yet preventing contaminants from being siphoned into the system through the drain.

SUMMARY OF THE INVENTION

In view of the foregoing, it is an object of this invention to backwash a well filter automatically on a regular basis, without human intervention, and without electrical components.

Another object of the invention is to divert all backwash water to a drain remote from the well pump, and to prevent ingestion of contaminants through the drain, back into the system.

These and other objects of the invention are met by a system for providing filtered well water to a building, the system including a filter, an accumulator downstream of the filter, and an automatic backwash valve between the filter and the well. When the well pump is deactivated, the accumulator discharges its contents back through the filter, towards the valve, which contains a shuttle that automatically diverts the backwash water to a drain line. The valve also prevents contaminants from being sucked into the system through the drain line.

The valve itself includes a housing having an inlet hydraulically connected to the pump, an outlet connected to the drain, and a lateral port connected to the supply line. The housing has a through bore extending between the inlet and the outlet, and a shuttle contained within the bore has a hollow, perforated core interconnecting a head at the outlet end and a base at the inlet end. The base includes a check valve for preventing flow back toward the pump, and the head acts as a valve seat for blocking the outlet except when supply line pressure exceeds pump pressure.

BRIEF DESCRIPTION OF THE DRAWINGS

In the accompanying drawings.

DESCRIPTION OF THE PREFERRED EMBODIMENT

Figure 1:
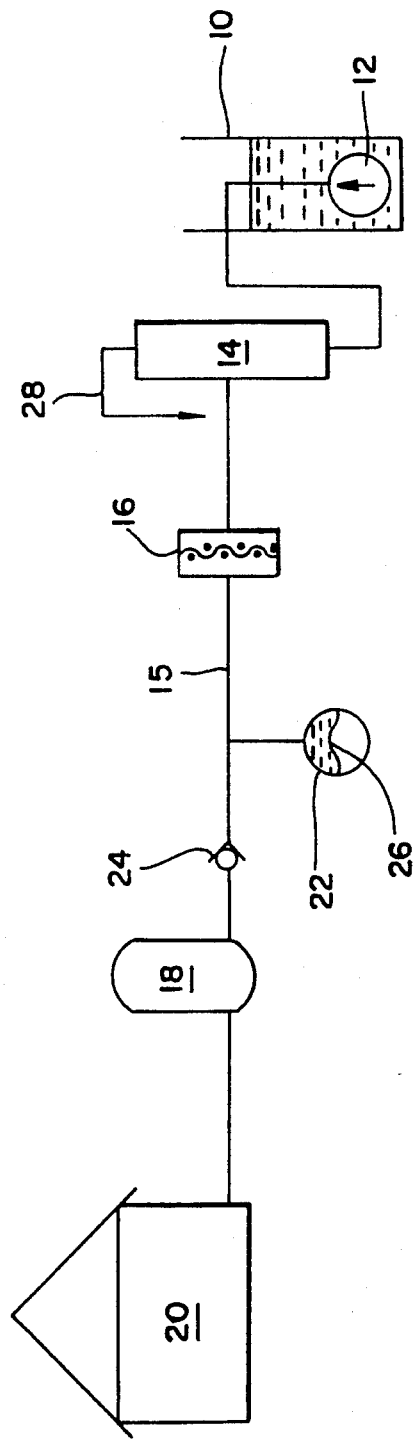
FIG. 1 is a diagram of a plumbing system including a well pump, a filter, and means for backwashing the filter.

As shown in FIG. 1, a system embodying the invention comprises a well 10, a pump 12 at or in the well for pumping water from the bottom of the well to a supply line, and a valve 14 downstream of the pump for controlling water flow in the supply line. The supply line 15 passes from the valve 14 through a conventional filter 16 which removes sediment from the water, before it enters a pressurized storage tank 18 within a home or building 20. Between the filter and the storage tank, there is a smaller pressure tank or accumulator 22, and then a check valve 24 that prevents from flowing back out of the storage tank. The accumulator 22 has a captive air chamber defined below a bellows 26 or the like; since air in the chamber remains at the same pressure as the water in the supply line, it compresses or expands as line pressure varies. Thus, when the well pump is active, water flows into the accumulator until equilibrium is reached, and when the well pump is deactivated, the air forces water back out, into the supply line. Since the pressure downstream of the check valve 24 is higher than that in the line 15 when the pump is off, water flow out of the accumulator is back through the filter, in the direction of the valve 14.

Were the valve 14 not provided, water would flow back into the well when the pump was turned off; however, the valve, functioning essentially as a two-way check valve, directs all reverse-flow water to a drain line 28. In this way, such water, which has backflushed the filter and thus has more sediment than the well water, is removed from the system.

Figure 2:
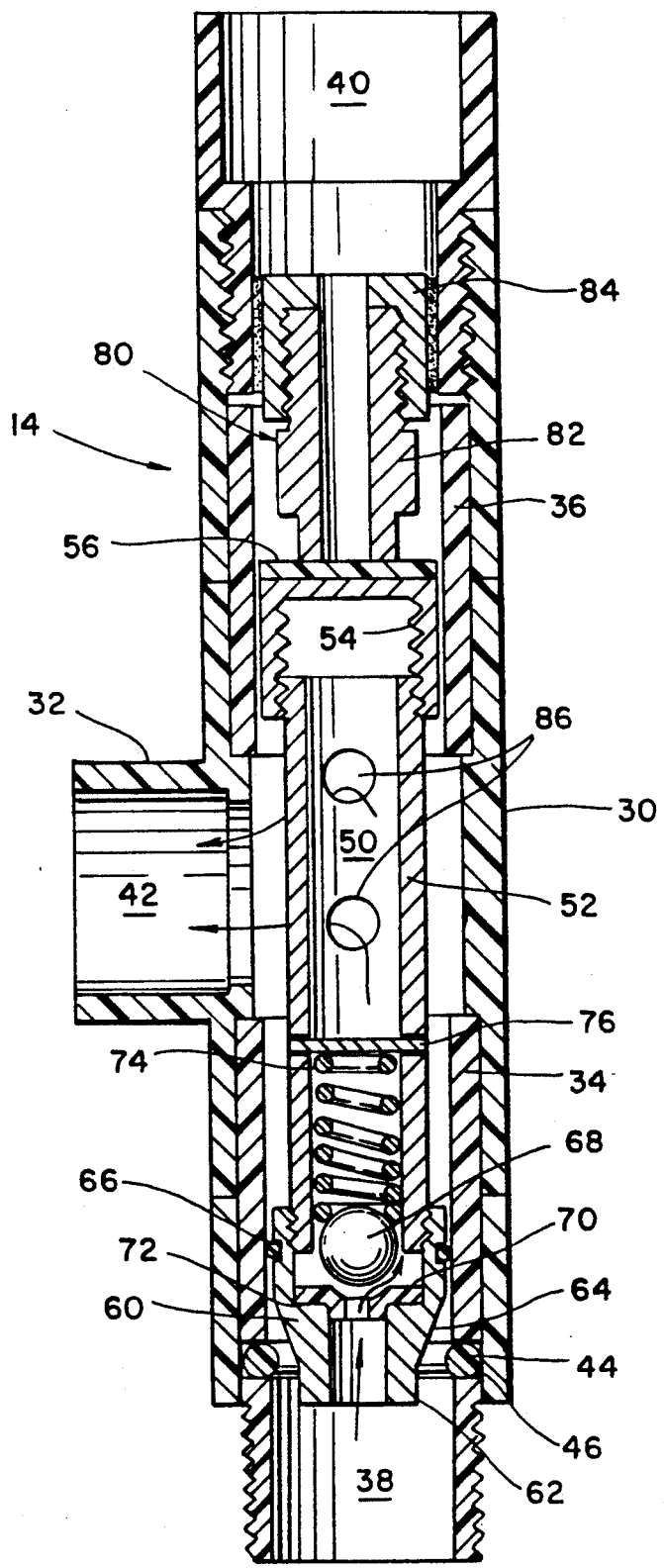
FIG. 2 is a detailed view of a valve which controls water flow to and from the filter, in its normal operating mode.

The valve 14, shown in detail in FIG. 2, is purely mechanical. It has a housing 30 formed from a PVC (polyvinylchloride) tee 32, into the opposed ends of which short PVC sleeves 34, 36 are inserted. A reduced-diameter externally threaded inlet 38 is affixed to the protruding portion of the sleeve at the lower end of the housing, for connection to the well line. An internally threaded drain fitting 40 is affixed to the upper sleeve. The lateral port 42 of the tee is connected to the line 15 leading to the filter.

A large O-ring 44 is positioned in the inlet, between the end of the sleeve 34 and a shoulder 46 adjacent the inlet. This O-ring acts as a seat or stop for a valve shuttle assembly 50 which has a sliding fit within the sleeves 34, 36. The shuttle assembly comprises a tubular core 52, threaded at both ends, with an internally-threaded head 54 affixed to one end. A rubber disc 56 is secured to the upper, flat surface of the head, and the periphery of the head slides within the sleeve 36.

Figure 3:
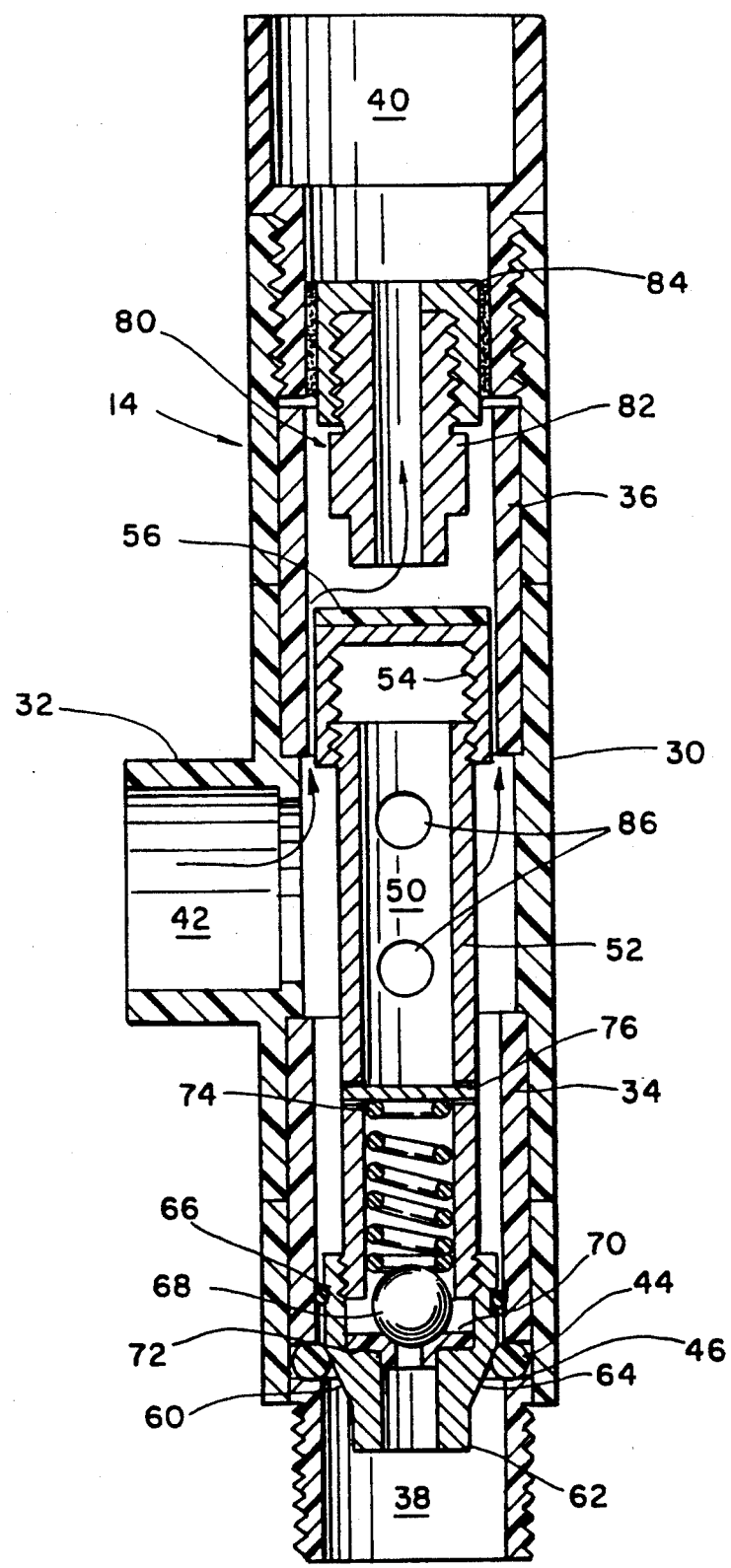
FIG. 3 is a view like FIG. 2, showing the valve in its backwashing mode.

A base fitting 60 is affixed to the bottom of the core 52. The exterior of the base tapers inwardly to a reduced-diameter pilot 62. The intermediate, tapered portion 64 seats against the O-ring 44 when the shuttle is driven toward the inlet by line pressure when the pump is deactivated, as shown in FIG. 3. The base fitting, which slides within the sleeve 34, is externally grooved to receive a small O-ring 66 that prevents leakage around the base.

Inside the base fitting, there is a ball 68, which seals against a seat 70, resting on a shoulder 72 within the fitting. The ball 68 is biased toward the seat by a coil spring 74, held in compression by a transverse pin 76 extending through holes in the core 52.

Secured at the upper end of the valve is a tubular element 80 having a planar lower annular surface facing a rubber disc 56 affixed to the head 54. The element 80 is formed from a core member 82 and a head 84 that is adhesively bonded within the drain fitting 40.

FIG. 2 shows the configuration of the valve when the pump is running, delivering water through the filter to the storage tank. In this mode, the pressure forces acting on the shuttle are balanced, except for the differential pressure across the head 54, which holds the shuttle upward against the tubular element 80. The ball 68 is held off its seat 70 by pump pressure, and so water flows around the ball, through the holes 86 in the core 52, to the port 42, and to the filter.

When the well pump is deactivated (e.g., in response to a signal indicating the storage tank is full), system pressure falls, whereupon the air confined in the accumulator forces water back out into the line, and along the path of least resistance, namely through the filter, back toward the valve 14. The greater pressure in the valve is now above the ball, so it seats, whereafter differential pressure acting on the base seats the taper against the O-ring. This configuration is shown in FIG. 3. Downward movement of the shuttle has left a large gap between the rubber disc 56 and the tubular member 80, so that the backflush water can escape to the drain line 28. The ball valve 68, still seated, prevents contaminants from being siphoned into the well through the drain line.

This system provides several advantages. First, backwashing of the filter is automatic, and occurs every time the pump is deactivated. Second, backwash water is purged from the system, so as not to contaminate the well or water delivered to the house. Third, the well is protected from contamination by either backwash water or drain field water. No electrical components are required, and existing plumbing systems can be easily modified so as to provide filter backwashing, thus prolonging filter life and reducing flow restriction at the filter.

Inasmuch as the invention is subject to modifications and variations, it is intended that the foregoing description and the accompanying drawings shall be interpreted as illustrative of only one form of the invention, whose scope is to be measured by the following claims.

I claim:

1. A system constructed and arranged for filtering water from a well having a pump, comprising
   a supply line having an upstream end connectable to the well and a downstream end connectable to a storage tank,
   a check valve in said supply line upstream of the storage tank,
   an accumulator containing a compressible fluid and water in communication with said supply line at a point upstream of the check valve,
   a filter in said supply line upstream of the accumulator, and
   an automatic backwash valve installed in the supply line between the filter and the upstream end of the supply line, said backwash valve having an outlet connected to a drain line, and containing means for automatically directing any water driven backwards through the filter by the accumulator, in response to the pump deactivated, to the drain line, rather than to the pump.

2. The invention of claim 1, further comprising means for preventing contaminants from being siphoned into the well from the drain line.

3. The invention of claim 1, wherein the backwash valve comprises
   a housing having an inlet hydraulically connected to the pump, an outlet connected to the drain, and a port connected to the supply line, said housing having a through bore extending between said inlet and said outlet,
   a shuttle contained within the bore, said shuttle comprising a hollow, perforated core interconnecting a head at the end closer to the outlet, and a base at the end closer to the inlet, said base containing a check valve for preventing flow back toward the pump, and
   means for blocking the drain outlet except when supply line pressure downstream of the valve exceeds supply line pressure upstream of the valve.

* * * * *